United States Patent [19]
Lee

[11] Patent Number: 5,677,810
[45] Date of Patent: Oct. 14, 1997

[54] TAPE CASSETTE LOADING MECHANISM IN MAGNETIC RECORDING/REPRODUCING APPARATUS FOR SELECTIVELY LOADING DIFFERENT-SIZED TAPE CASSETTES

[75] Inventor: Min-su Lee, Uiwang, Rep. of Korea

[73] Assignee: Samsung Electronics Co., Ltd., Kyungki-do, Rep. of Korea

[21] Appl. No.: 649,493

[22] Filed: May 17, 1996

[30] Foreign Application Priority Data

May 18, 1995 [KR] Rep. of Korea ............. 95-12462

[51] Int. Cl.⁶ .................................................. G11B 15/18
[52] U.S. Cl. ..................................... 360/94; 360/96.3
[58] Field of Search ......................... 360/92, 94, 96.5, 360/95, 96.3

[56] References Cited

U.S. PATENT DOCUMENTS

| | | | |
|---|---|---|---|
| 4,490,757 | 12/1984 | Mogi | 360/94 |
| 4,729,046 | 3/1988 | Steipe et al. | 360/94 |
| 4,903,149 | 2/1990 | Hasegawa et al. | 360/94 |
| 4,984,109 | 1/1991 | Yokoo | 360/94 |
| 5,025,331 | 6/1991 | Hirayama et al. | 360/94 |
| 5,225,954 | 7/1993 | Kondo | 360/94 |
| 5,314,141 | 5/1994 | Ishii et al. | 360/94 |
| 5,316,236 | 5/1994 | Hasegawa et al. | 360/94 |

FOREIGN PATENT DOCUMENTS

| | | | |
|---|---|---|---|
| 312397 | 4/1989 | European Pat. Off. . | |
| 463786 | 1/1992 | European Pat. Off. . | |
| 3234854 | 5/1983 | Germany . | |
| 55-45172 | 3/1980 | Japan | 360/94 |
| 63-112845 | 5/1988 | Japan | 360/94 |

*Primary Examiner*—Jefferson Evans
*Attorney, Agent, or Firm*—Sughrue, Mion, Zinn, Macpeak & Seas, PLLC

[57] ABSTRACT

A mechanism wherein reel tables of a recording/reproducing device are moved to selectively load different-sized tape cassettes thereon so that a tape cassette loading mechanism can stably support each of the different-sized tape cassettes. First and second loading pins move with the reel tables, and third and fourth loading pins are fixed on an upper deck. The first and second loading pins support the back end of a small tape cassette, and the third and fourth loading pins support the back end of a large tape cassette.

7 Claims, 5 Drawing Sheets

TAPE CASSETTE LOADING MECHANISM IN MAGNETIC RECORDING/ REPRODUCING APPARATUS FOR SELECTIVELY LOADING DIFFERENT-SIZED TAPE CASSETTES

BACKGROUND OF THE INVENTION

1. Field of the Invention

The present invention relates to a tape cassette loading mechanism in a magnetic recording/reproducing apparatus such as a VCR, a CAMCORDER, and a digital-video cassette recorder (D-VCR), and more particularly, to a tape cassette loading mechanism in a magnetic recording/ reproducing apparatus which moves reel tables so that different-sized tape cassettes can be selectively and reliably loaded on the reel tables.

2. Description of the Related Art

Generally, a loading pin for supporting a tape cassette to be loaded on a reel table is installed in the deck mechanism of a magnetic recording/reproducing apparatus such as a VCR, a CAMCORDER, and a digital-video cassette recorder (D-VCR).

Recently it has been proposed to provide a mechanism whereby a reel table can be moved so that different sized tape cassettes can selectively be loaded on the reel table. This mechanism which can selectively load different sized tape cassettes requires supporting means for stably and selectively supporting the different sized tape cassettes.

SUMMARY OF THE INVENTION

The present invention is contrived in accordance with the above requirement, and it is an object of the present invention to provide a tape cassette loading mechanism in a magnetic recording/reproducing apparatus, which supports tape cassettes so that different sized tape cassettes can be safely and selectively seated on reel tables.

To accomplish the above object, the invention is a tape cassette loading mechanism in a magnetic recording/ reproducing apparatus, comprising a lower deck having first and second arc-shaped holes and first and second fixed pins are formed therein. The holes and pins, respectively, are separated by a predetermined distance therebetween and an upper deck having third and fourth arc-shaped holes formed therein corresponding to the first and second holes formed in the lower deck includes a head drum having a magnetic head and a guiding device for guiding a magnetic tape, a pair of rotating arms rotatably installed on the first and second fixed pins, respectively, for supporting reel tables on which different sized tape cassettes are selectively loaded, a pair of driving arms rotatably combined with the first and second fixed pins each having gear portions that are engaged to one another, a driving motor connected to one of the gear portions of the driving arms, connecting means for connecting the driving arms and rotating arms to transmit the power from the driving motor to the respective rotating arms, and supporting means for supporting different sized tape cassettes on the reel tables.

It is preferable that an individual motor for rotating the respective reel tables is installed on each of the rotating arms. The connecting means includes cavities respectively formed on the bottom of the driving arms, indented portions formed on the top portions of the rotating arms corresponding to the cavities, and coil springs disposed is a space between the cavities and the indented portions, respectively.

The supporting means includes first and second loading pins fixed on the rotating arms, respectively, and third and fourth loading pins respectively formed on sides of the upper deck such that the first and second and third and fourth loading pins support different sized tape cassettes, respectively. Also, auxiliary loading pins for supporting the front portion of a tape cassette are provided on the upper deck. According to the present invention, the first and second loading pins are rotated with the rotating arms and support a small tape cassette, and the third and fourth loading pins are fixed on the upper deck and support a large tape cassette.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE PREFERRED EMBODIMENT

Figure 1:
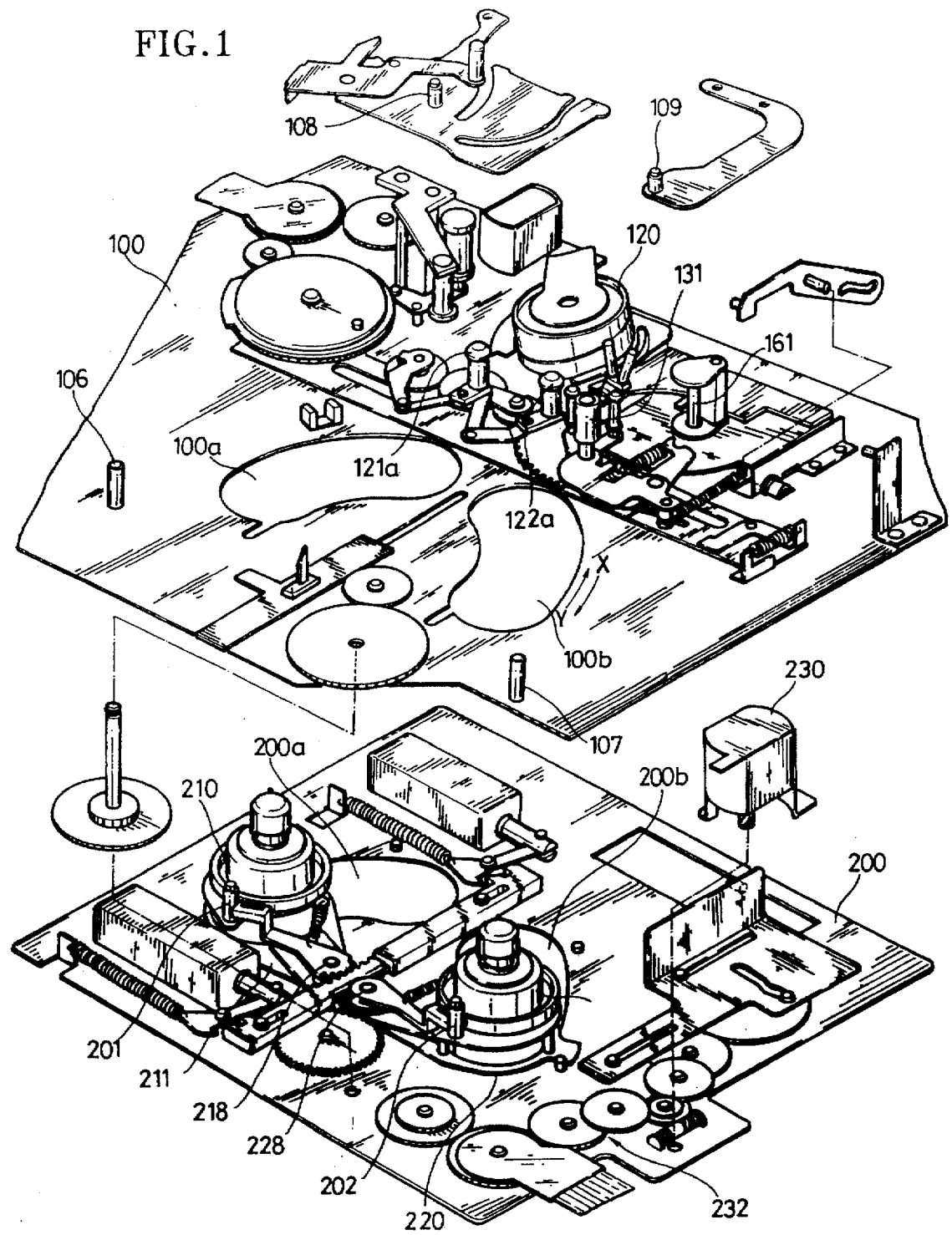
FIG. 1 is a schematic perspective view showing a tape cassette loading mechanism according to a preferred embodiment the present invention.
Figure 2:
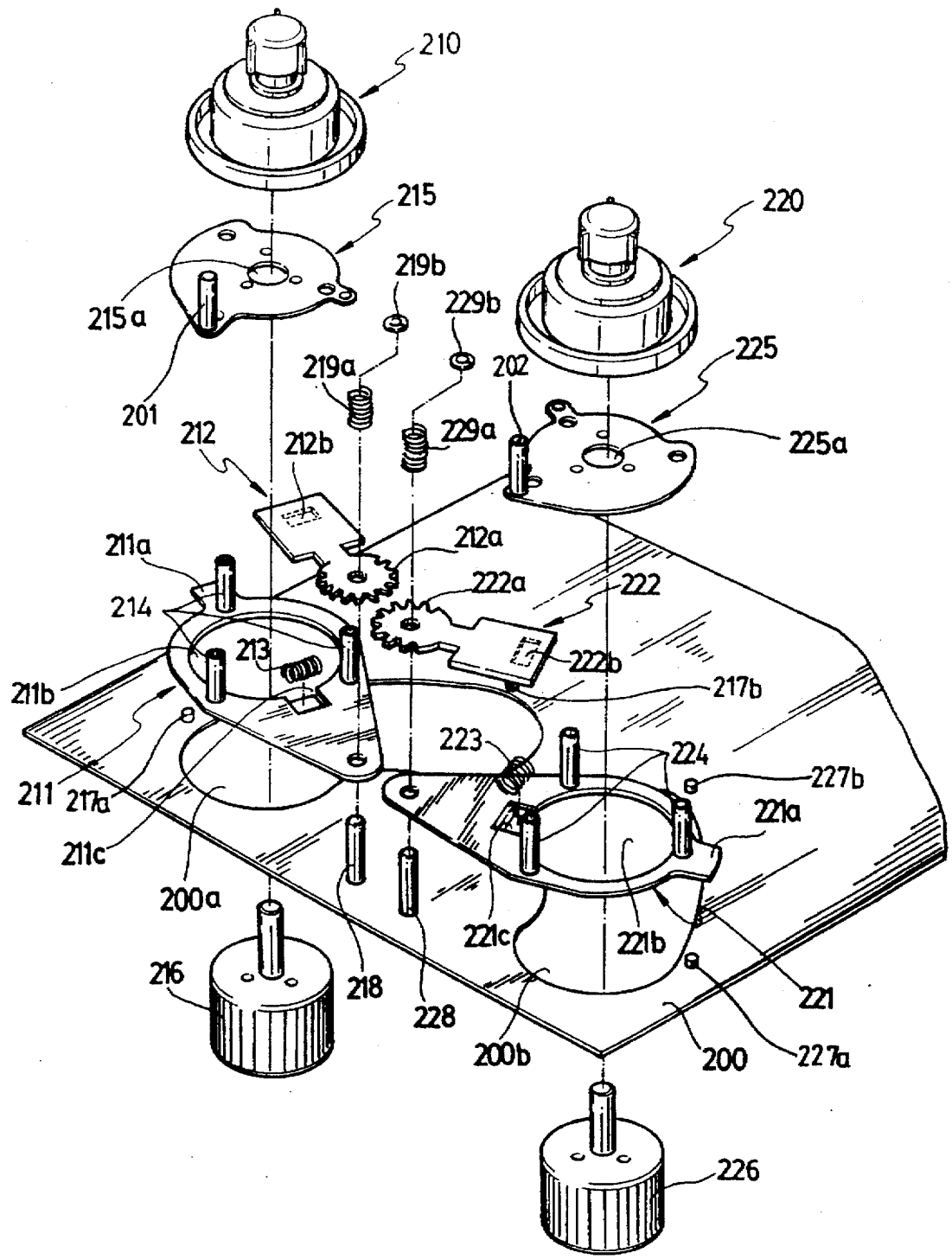
FIG. 2 is an exploded perspective view showing the essential parts of FIG. 1 extracted.

As illustrated in FIGS. 1 and 2, first and second arc-shaped holes 200a and 200b are formed on a lower deck 200, and first and second fixed pins 218 and 228 are separated from each other by a predetermined distance and are fixedly installed on lower deck 200 between the holes 200a and 200b. An upper deck 100 is installed above the lower deck 200 such that the two decks are separated from each other by a predetermined distance.

A head drum 120 and guide devices for guiding a tape (not shown) are installed on the upper deck 100. The guide devices include guide rollers 121a and 122a respectively installed on a pair of pole bases, a pinch roller 131 and a capstan motor pin 161 for pressing and transporting the tape.

Also, rotating arms 211 and 221 are rotatably coupled to the first and second fixed pins 218 and 228 on the lower deck 200. Driving arms 212 and 222 each having geared portions 212a and 222a are also rotatably coupled to the first and second fixed pins 218 and 228 respectively with the geared portions 212a and 222a engaged with each other. The driving arms 212 and 222 are elastically biased toward the rotating arms 211 and 221, respectively, via springs 219a and 229a and washers 219b and 229b.

Also, a driving motor 230 for generating a driving force is installed at one side of the lower deck 200. A driving force is transmitted to the gear portion 222a from the driving motor 230 via a gear train 232 (not all of which is visible in the Figures).

A connecting means for connecting the driving arms 212 and 222 and the rotating arms 211 and 221 is provided so that the power of the driving motor 230 can be transmitted to the respective rotating arms 211 and 221. The connecting means includes, cavities 212b and 222b formed on the respective lower surfaces of the driving arms 212 and 222, indented portions 211c and 221c formed on the respective rotating arms 211 and 221 corresponding to the cavities 212b and 222b, and coil springs 213 and 223 disposed between the cavities 212b and 222b and indented portions 211c and 221c, respectively. That is, the coil springs 213 and 223 are disposed half in cavities 212b and 222b, respectively, and half in indented portions 211c and 221c, respectively to abut respective edges. Thus, the driving motor 230 transmits power to the rotating arms 211 and 221 via the coil springs 213 and 223.

Reel tables 210 and 220 and motors 216 and 226 for rotating the reel tables 210 and 220 are installed on rotating arms 211 and 221, respectively. In more detail, coupling holes 211b and 221b, to which the motors 216 and 226 are coupled, respectively, are formed in each rotating arm 211 and 221. Plates 215 and 225 having holes 215a and 225a are fixedly installed at the rotating arms 211 and 221, being supported above the coupling holes 211b and 221b by a plurality of supports 214 and 224. The rotors of motors 216 and 226 are connected to the reel tables 210 and 220 through the holes 214a and 225a of the plates 215 and 225.

Meanwhile, preventing means for preventing the excess rotation of the rotating arms 211 and 221 is constituted by protrusions 211a and 221a formed at the outer ends of the rotating arms 211 and 221, and stoppers 217a, 217b, 227a and 227b formed on the lower deck 200. Interaction between these elements limits the rotation of the rotating arms 211 and 221. The stoppers 217a, 217b, 227a and 227b can be formed at predetermined positions along the rotating path of the protrusions 211a and 221a to limit rotation to be within a desired angular interval.

Figure 3:
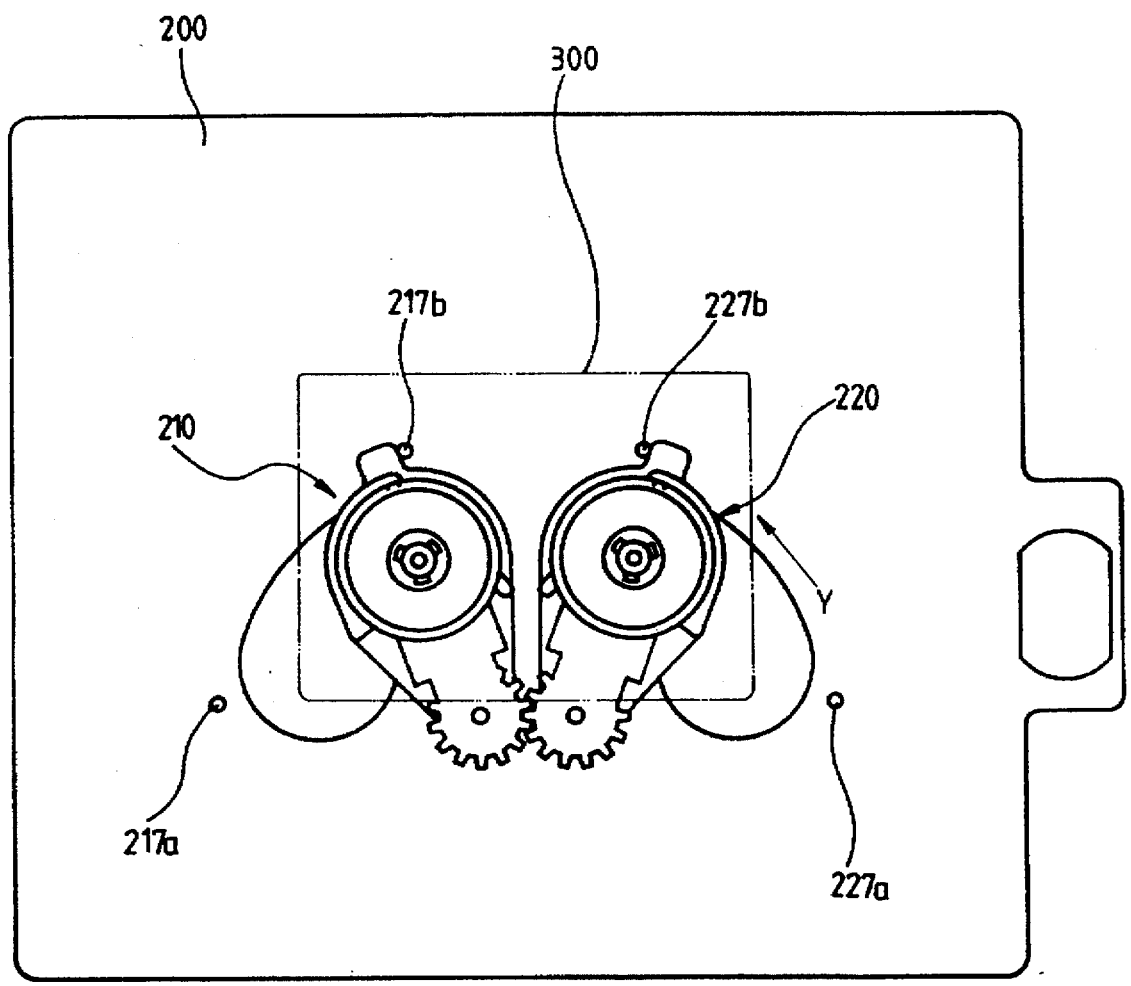
FIG. 3 is a plan view showing the preferred embodiment with a small tape cassette loaded.
Figure 4:
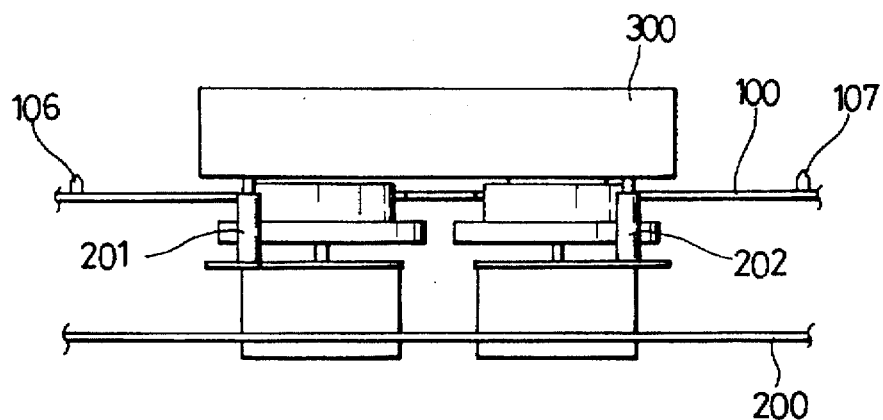
FIG. 4 is a schematic sectional side view of FIG. 3.
Figure 6:
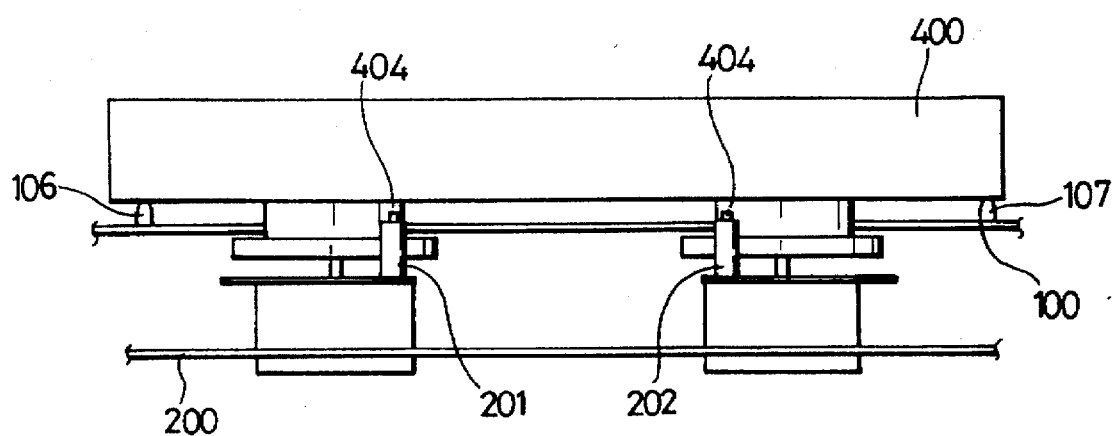
FIG. 6 is a schematic sectional side view of FIG. 5.
Figure 5:
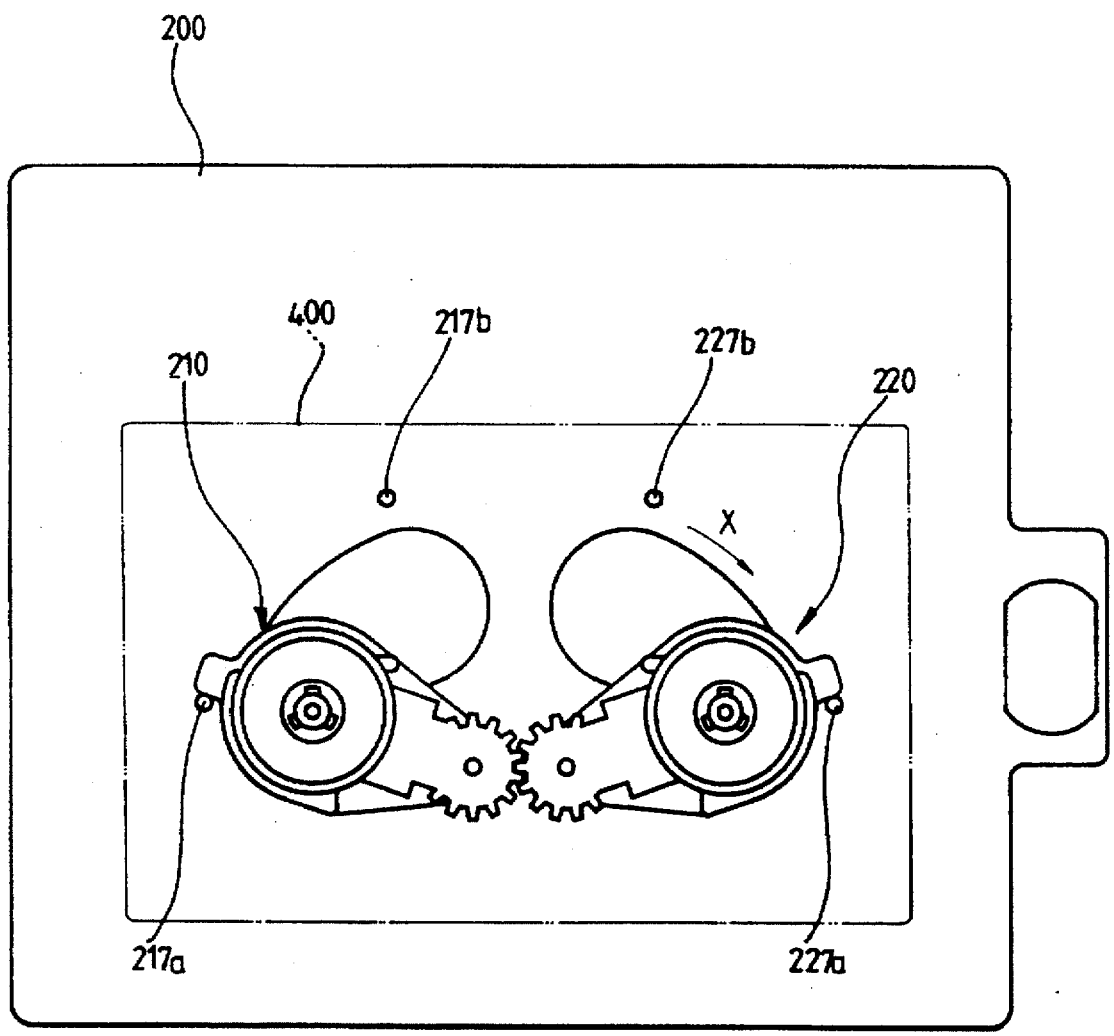
FIG. 5 is a plan view showing the preferred embodiment with a large tape cassette loaded.

Also, supporting means for supporting different-sized tape cassettes is provided. The supporting means includes first and second loading pins 201 and 202 fixed on the plates 215 and 225, respectively, and third and fourth loading pins 106 and 107 fixed at the sides on the upper deck 100. The first and second loading pins 201 and 202 and third and fourth loading pins 106 and 107 selectively support different-sized tape cassettes. Specifically, as shown in FIGS. 3 and 4, the first and second loading pins 201 and 202 support, from the bottom, the back end of a small tape cassette 300 seated on the reel tables 210 and 220. At this time, i.e., when a small cassette is loaded, the third and fourth loading pins 106 and 107 do not interfere with the small tape cassette 300. FIG. 5 shows the third and fourth loading pins 106 and 107 supporting the lower edge portions of a large tape cassette 400. At this time, i.e., when a large tap cassette is loaded, the first and second loading pins 201 and 202 are positioned proximate the reel tables 210 and 220, respectively. As shown in FIG. 6, a clearance 404 is formed between the large cassette 400 and first and second loading pins 201 and 202 so that the pins 201 and 202 do not interfere with the large tape cassette 400 because first and second loading pins 201 and 202 do not extend upward to the same degree as third and fourth loading pins 108 and 107. In another embodiment, the first and second loading pins 201 and 202 can be formed so that the first and second loading pins 201 and 202 support the large tape cassette 400 in addition to the third and fourth loading pins 106 and 107.

Auxiliary loading pins 108 and 109 are installed on the upper deck 100 to support further the front portion of the small tape cassette 300 from the bottom thereof. When the upper and lower decks 100 and 200 are combined, only the reel tables 210 and 220 and the first and second loading pins 201 and 202 pass through the third and fourth holes 100a and 100b to the upper deck 100.

The tape cassette loading mechanism according to the preferred embodiment of the present invention functions in the following manner.

When a large tape cassette is loaded, the distance between the reel tables 210 and 220 is controlled as follows. First, when the driving motor 230 is driven so that the last gear of gear train 232 engaged with the gear portion 222a of the driving arm 222 rotates counterclockwise, the two engaged rotating arms 211 and 221 rotate along the direction of arrow X of the third and fourth holes 100a and 100b. Eventually, the protrusions 211a and 221a of the rotating arms 211 and 221 contact the stoppers 217a and 227a. The driving arms 212 and 222 are rotated slightly further as the driving arms 212 and 222 press against, and thus compress, the coil springs 213 and 223 by the force of the driving motor 230. At this time, the rotating arms 211 and 221 are pressed tightly against the stoppers 217a and 227a due to the restoring forces of the springs 213 and 223. Thus, the reel tables 210 and 220 are stably at rest at their final position. At this time, the large tape cassette 400, as shown in FIGS. 5 and 6, can be stably supported on the third and fourth loading pins 106 and 107. Thus, when the large tape cassette 400 is loaded on the reel tables 210 and 220, the first and second loading pins 201 and 202 are positioned under the tape cassette 400 with a clearance therebetween to thereby not interfere during loading of the large tape cassette 400 on the reel tables 210 and 220.

When a small tape cassette is to be loaded, as shown in FIGS. 3 and 4, the distance between the reel tables 210 and 220 is controlled as follows. When the driving motor 230 is driven so that the final gear of the gear train 232 which is engaged with the gear portion 222a of the driving arm 222 rotates clockwise, the two engaged rotating arms 211 and 221 rotate in the direction of arrow Y along the third and fourth holes 100a and 100b. Eventually, the protrusions 211a and 221a of the rotating arms 211 and 221 make contact with the stoppers 217b and 227b. The driving arms 212 and 222 are further rotated by the force of the driving motor 230 compressing the coil springs 213 and 223. The rotating arms 211 and 221 thus are pressed against the respective stoppers 217b and 227b due to the restoring force of the springs 213 and 223. Thus, the reel tables 210 and 220 are stably at rest at their final position where the reel tables, 210 and 220 are close together, thus corresponding to a small tape cassette. In this state, the small tape cassette can be seated on the two reel tables 210 and 220 which are separated by only a small distance. The first and second loading pins 201 and 202 support the small tape cassette 300 loaded on the reel tables 210 and 220 from the bottom, and the loading pins 208 and 209 support cassette near the head portion. Here, the third and fourth loading pins 106 and 107 do not interfere with the small tape cassette 300 because they are positioned outside of the dimensions of the tape cassette 300.

As described above, in the present invention, different sized tape cassettes 300 and 400 can be loaded onto the reel tables 210 and 220 and stably supported selectively by the first and second loading pins 201 and 202 which move with the reel tables 210 and 220, and the third and fourth loading pins 106 and 107 that are fixed onto the upper deck 100. The invention can be controlled by known control devices The invention has been described through a preferred embodiment. However, various modifications can be made without departing from the scope of the invention as defined by the appended claims.

What is claimed is:

1. A tape cassette loading mechanism for a magnetic recording/reproducing apparatus, comprising:
   a lower deck having first and second arc-shaped holes formed therein;

first and second fixed pins formed on said lower deck, wherein said first and second fixed pins are separated by a predetermined distance therebetween; and an upper deck having third and fourth arc-shaped holes formed therein and which correspond to the first and second arc-shaped holes formed in said lower deck:

a head drum having a magnetic head and a guiding device for guiding a magnetic tape disposed on said upper deck;

a pair of rotating arms rotatably installed on said first and second fixed pins, respectively;

reel tables, supported respectively on said rotating arms, on which different-sized tape cassettes are selectively loaded;

a pair of driving arms rotatably disposed on said first and second fixed pins, each of said driving arms having gear portions that are engaged with one another;

a driving motor connected to one of said gear portions of said driving arms;

connecting means for connecting said driving arms to said rotating arms respectively to transmit power from said driving motor to said rotating arms; and supporting means for supporting different-sized tape cassettes loaded on the reel tables.

2. A tape cassette loading mechanism for a magnetic recording/reproducing apparatus as claimed in claim 1, wherein motors, for respectively rotating the reel tables, are respectively coupled to said rotating arms.

3. A tape cassette loading mechanism for a magnetic recording/reproducing apparatus as claimed in claim 1, wherein said connecting means includes:

a cavity respectively on the bottom of each of said driving arms;

an indented portion formed on the top portion of each of said rotating arms in opposition to said cavities respectively; and a coil spring disposed in a space between each of said cavities and said indented portions, respectively.

4. A tape cassette loading mechanism for a magnetic recording/reproducing apparatus as claimed in claim 1, further comprising preventing means for preventing said rotating arms from rotating beyond a predetermined angular position.

5. A tape cassette loading mechanism for a magnetic recording/reproducing apparatus as claimed in claim 4, wherein said preventing means comprises:

a protrusion formed on each of said rotating arms; and stoppers formed on said second deck for interaction with said protrusions.

6. A tape cassette loading mechanism for a magnetic recording/reproducing apparatus as claimed in claim 1, wherein said supporting means comprises:

first and second loading pins fixed on said rotating arms, respectively; and third and fourth loading pins respectively disposed on sides of said upper deck, such that said first and second and third and fourth loading pins support different-sized tape cassettes, respectively.

7. A tape cassette loading mechanism for a magnetic recording/reproducing apparatus as claimed in claim 6, further comprising auxiliary loading pins formed on said upper deck for supporting a front portion of a tape cassette.

* * * * *